(12) United States Patent
Arcese et al.

(10) Patent No.: US 8,584,121 B2
(45) Date of Patent: *Nov. 12, 2013

(54) USING A SCORE-BASED TEMPLATE TO PROVIDE A VIRTUAL MACHINE

(75) Inventors: Mauro Arcese, Rome (IT); Luigi Pichetti, Rome (IT); Roberto Piras, Rome (IT)

(73) Assignee: International Business Machines Corporation, Armonk, NY (US)

( * ) Notice: Subject to any disclaimer, the term of this patent is extended or adjusted under 35 U.S.C. 154(b) by 77 days.

This patent is subject to a terminal disclaimer.

(21) Appl. No.: 13/280,590

(22) Filed: Oct. 25, 2011

(65) Prior Publication Data

US 2012/0131577 A1    May 24, 2012

(30) Foreign Application Priority Data

Nov. 19, 2010  (EP) ..................................... 10191899

(51) Int. Cl.
*G06F 9/455* (2006.01)
*G06F 9/46* (2006.01)
*G06F 9/44* (2006.01)
*G06F 17/30* (2006.01)

(52) U.S. Cl.
USPC ............... 718/1; 718/104; 717/120; 717/121; 707/E17.001; 707/E17.044

(58) Field of Classification Search
None
See application file for complete search history.

(56) References Cited

U.S. PATENT DOCUMENTS

| | | |
|---|---|---|
| 7,577,722 B1 | 8/2009 | Khandekar et al. |
| 2007/0157185 A1 | 7/2007 | Semerdzhiev et al. |
| 2007/0165937 A1 | 7/2007 | Markov et al. |
| 2008/0163171 A1 | 7/2008 | Chess et al. |
| 2008/0256534 A1 | 10/2008 | Chess et al. |
| 2008/0256535 A1 | 10/2008 | Carter et al. |
| 2008/0301674 A1 | 12/2008 | Faus |
| 2009/0249335 A1 | 10/2009 | Vasilevsky et al. |
| 2009/0249374 A1 | 10/2009 | Hepper et al. |
| 2009/0300057 A1 | 12/2009 | Friedman |
| 2009/0313620 A1 | 12/2009 | Sedukhin et al. |
| 2010/0023939 A1 | 1/2010 | Takahashi |

FOREIGN PATENT DOCUMENTS

EP    2037362 A1    3/2009

OTHER PUBLICATIONS

Notification of Transmittal of the International Search Report and the Written Opinion of the International Searching Authority for PCT Application No. PCT/EP2011/068695, Mailing Date of Dec. 23, 2011; European Patent Office; Rijswijk, Netherlands.

Written Opinion of the International Searching Authority for PCT Application No. PCT/EP2011/068695, Mailing Date of Dec. 23, 2011; European Patent Office; Munich, Germany.

(Continued)

*Primary Examiner* — Jennifer To
*Assistant Examiner* — Bing Zhao
(74) *Attorney, Agent, or Firm* — Thomas E. Lees, LLC

(57) ABSTRACT

A software element database stores software element definitions according to a software element hierarchy. A score is assigned to at least one of the software element based at least in part upon the software element's hierarchy level. Further, virtual machine templates are stored in a library. The virtual machine templates include at least one software element associated with a software element from the software element database. A user enters a specification that specifies desired software elements to be included in the virtual machine via a user interface. After the specification is entered, the a score value is calculated for at least one virtual machine template from the library, based on the scores assigned to the software elements. Using the calculated score, the virtual machine template having the highest score value is selected and the selected virtual machine template is delivered as the virtual machine to a hypervisor.

20 Claims, 4 Drawing Sheets

(56) References Cited

OTHER PUBLICATIONS

Office Action dated Apr. 11, 2013 for U.S. Appl. No. 13/463,350, Mauro Arcese et al., "Providing a Virtual Machine", filed May 3, 2012.

Kyrre M. Begnum and Matthew Disney, "Scalable Deployment and Configuration of High-Performance Virtual Clusters", World Academy of Science and Technology, 2006.

Xian-He Sun et al., "V-MCS: A Configuration System for Virtual Machines", Computer Science Department, Illinois Institute of Technology, Chicago, IL; IEEE Xplore, ISBN 978-1-4244-5012-1, 2009.

H. Andres Lagar-Cavilla et al., "SnowFlock: Rapid Virtual Machine Cloning for Cloud Computing", EuroSys '09, Apr. 1-3, 2009, Nuremberg, Germany; ACM, 2009.

Ruth Willenborg et al., "Using Virtual Image Templates to Deploy WebSphere Application Server", IBM developerWorks, May 9, 2007.

Le He et al., "Automating Deployment and Activation of Virtual Images", IBM developerWorks, Aug. 22, 2007.

Notification Concerning Transmittal of International Preliminary Report on Patentability with International Preliminary Report on Patentability for PCT Application No. PCT/EP2011/068695, Mailing Date of May 30, 2013; The International Bureau of WIPO; Geneva, Switzerland.

Written Opinion of the International Searching Authority for PCT Application No. PCT/EP2011/068695, Mailing Date of May 30, 2013; European Patent Office; Munich, Germany.

USING A SCORE-BASED TEMPLATE TO PROVIDE A VIRTUAL MACHINE

CROSS-REFERENCE TO RELATED APPLICATIONS

This application claims priority to European Patent Application No. 10191899.3, filed Nov. 19, 2010, the disclosure of which is incorporated herein by reference.

BACKGROUND

Various aspects of the present invention relate generally to providing a virtual machine according to a user's specification for use on a hypervisor.

Virtual machines allow the use of different software installations that would normally require different hardware platforms to be run on a physical machine. For example, high performance server computers can be easily accessed from different client computers, such that the user does not have to be aware of the underlying hardware of the server for running the desired software. Basically, a hypervisor, or virtual machine manager, is installed on a hardware platform and provides an environment for running one or more virtual machines. Each virtual machine can function as a guest, which allows the execution of an appropriate operation system necessary to run desired applications. The hypervisor itself can run directly on the hardware platform without a separate operating system, or the hypervisor can run as an application within a standard operating system like Linux, Windows, or others. Also, the hypervisor can run on an intermediate abstraction layer.

To provide a suitable virtual machine, the user may be provided with the option to specify an operating system to be used as a basis for further software elements. Moreover, the user may be provided with the option to specify a combination of middleware as well as specific applications and utilities to be available to the operating system in the virtual machine. Regardless, to allow efficient operation, the virtual machines should be provided in a timely fashion upon request by the user and with limited resource utilization.

BRIEF SUMMARY

According to various aspects of the present invention, a virtual machine is provided for use on a hypervisor. In this regard, a software element database stores software element definitions according to a software element hierarchy. A score is assigned to at least one of the software elements based at least in part upon a hierarchy level associated with the software element. Further, virtual machine templates are provided in a library, where the virtual machine templates include at least one software element associated with a software element from the software element database. Also, a user interface is provided for a user to specify desired software elements to be included in the virtual machine. In response to the specification of desired software elements, a score value is calculated for at least one virtual machine template from the library based on the scores assigned to the software elements. Moreover, a selected virtual machine template is obtained from the library based upon the calculated score values and the selected virtual machine template is delivered as the virtual machine to the hypervisor.

DETAILED DESCRIPTION

Figure 1:
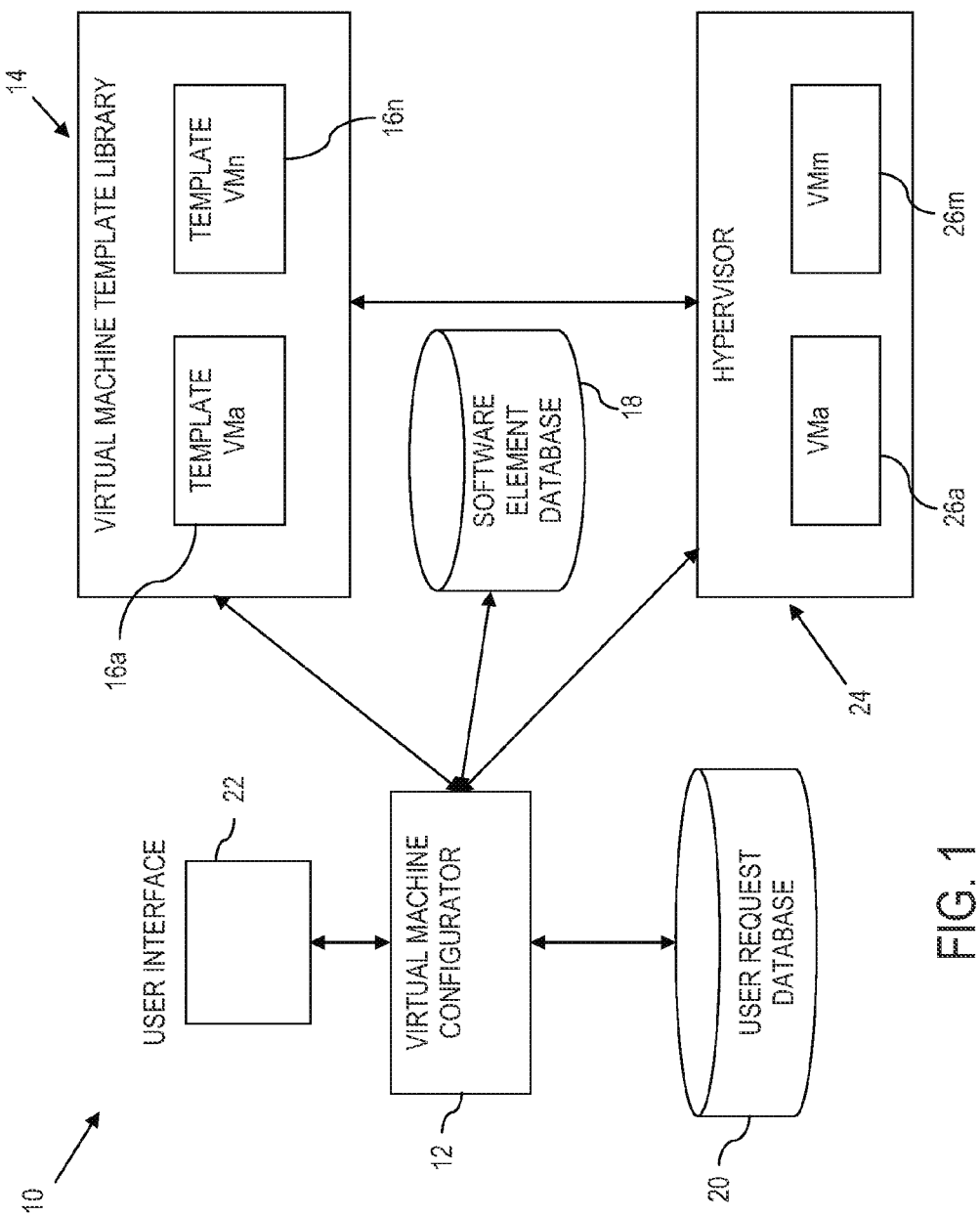
FIG. 1 shows a block diagram for providing a virtual machine for use on a hypervisor according to various aspects of the present invention.

According to various aspects of the present invention, a virtual machine is provided for use on a hypervisor. In general, a user provides a specification, which is used to automatically select a suitable virtual machine template. Depending upon the user's specification, the selected virtual machine template may be modified as necessary to satisfy the provided user specification. The virtual machine template is then used for providing the virtual machine. In this manner, a virtual machine requested by a user can be created in a short time.

According to further aspects of the present invention, a system for providing a virtual machine comprises a virtual machine configurator and a library containing available virtual machine templates. More particularly, the virtual machine configurator allows a user to enter a specification through a user interface by specifying desired software elements. The software elements are in different software hierarchy levels (e.g., operating system, middleware, application, utility, etc.). Moreover, the virtual machine templates in the library are based off of the software elements. The virtual machine configurator applies a scoring algorithm to calculate a score value for virtual machine templates from the library. The scoring algorithm is based upon the software elements specified by the user and is further based on scores assigned to software elements according to their software hierarchy level. The virtual machine configurator selects the virtual machine template from the library based upon the score values, e.g., by selecting the template having the highest score value, and delivers the selected virtual machine template as a virtual machine to the hypervisor.

According to a modified embodiment of the present invention, various software elements, which can be selected by the user for use in creating a virtual machine, can each have a different score value assigned thereto. Different score values can be established for each software element within a hierarchy level, and different score values can be established according to the different software hierarchy levels. The separation of software elements according to different software hierarchy levels enables consideration of provisioning requirements, which are usually different for the distinct software hierarchy levels. The scoring algorithm automatically calculates the score value, e.g., for all available virtual machine templates from the library. Based on the calculated score values, the virtual machine template with the highest score value is automatically selected and provided to the hypervisor.

For instance, hierarchy levels may include an operating system level, a middleware level, an application level and a utility level, the operating system level being the highest and the utility level being the lowest software hierarchy level. The different hierarchy levels consider factors such as provisioning time. For example, the entire installation of an operating system implies a bigger provisioning time for the virtual machine compared to just adding a utility, which is usually a small piece of software that can easily be installed. The use of four hierarchy levels, such as in the example above, is usually sufficient to allow the user an appropriate choice of software elements and represents a typical software installation. Nevertheless, a different number of software hierarchy levels can also be implemented.

One of the ways the scores can be calculated is by determining if a software element included in the virtual machine template is requested by the user and adding that element's score to the scoring value. However, if the included element is not requested by the user, then the element's score is subtracted from the scoring value. Accordingly, differences between software elements of the same hierarchy level can be considered when calculating scores for a virtual machine template. For example, software elements that are more complicated to install or require a longer time for installation can have a higher element score.

In some embodiments, the virtual machine configurator selects the virtual machine template with the highest score, and then compares the score of the selected template with a predetermined threshold value. If the score of the selected template is higher than the threshold value, then the configurator uses the template to make an instance of the virtual machine. Otherwise, the virtual machine is made from scratch.

Referring now to the figures and in particular FIG. 1, a system 10 for providing a virtual machine according to a user's specification includes a virtual machine configurator 12 and a library 14 containing available virtual machine templates. In the illustrative implementation, the virtual machine configurator 12 is a computer program product with a computer usable program code. The virtual machine configurator 12 is executed on server hardware (not shown).

As noted above, the virtual machine configurator 12 is located within a network so as to be connected to the virtual machine template library 14. The virtual machine template library 14 contains virtual machine templates 16a-n (collectively 16). Each virtual machine template 16 may contain a software image, and configuration information that enables the delivery and execution of the image. The library 14 can be implemented as a database, which can be allocated at any place within the network. For instance, the library 14 can be allocated physically on the same hardware platform as the virtual machine configurator 12. Alternatively, the library 14 can be provided on different locations within the network.

The system 10 further comprises a software element database 18 that contains software elements. The software elements are installable files that can be used for building virtual machine templates 16 or for adding to an existing virtual machine template 16. The software element database 18 can contain all offered software elements, or just most frequently used software elements, so that less frequently used software elements have to be requested from a different database when required. The software element database 18 can be provided on any kind of a server in the network or even outside in a third party database.

Furthermore, the system 10 comprises a user request database 20, which is also connected to the virtual machine configurator 12 via the network. The user request database 20 can either be provided on the same hardware platform like the virtual machine configurator 12 or at a different location within the network. The request database 20 can also be provided in an external network. The user request database 20 stores user requests, which are entered via a user interface 22 provided by the virtual machine configurator 12. The user interface 22 is provided on a client system connected to the virtual machine configurator 12 via the network. As such, the user interface 22 provided by the virtual machine configurator 12 can be accessed from any point within the network for specifying the desired configuration of the software elements.

In operation, a user provides a specification of software elements, which the virtual machine configurator 12 uses to automatically select a suitable virtual machine template. Depending upon the user's specification, the selected virtual machine template may be modified as necessary to satisfy the provided user specification. The virtual machine template is then used for providing the virtual machine.

The system 10 of the present invention connects to a hypervisor 24, e.g., high performance computer hardware for hosting multiple virtual machines 26a-m (collectively 26) via the network. Accordingly, the virtual machines 26 provided by the virtual machine configurator 12 can be executed on the hypervisor 24 without considering the underlying hardware.

In this regard, the virtual machine configurator 12 can be run on dedicated hardware within the network, which is connected to the hardware on which the corresponding hypervisor 24 is running. The virtual machine configurator 12 can alternatively be located physically on the same hardware platform as the hypervisor 24. The hypervisor itself can be a single hypervisor instance running on its hardware platform, the hypervisor can be one out of multiple hypervisors running on respective multiple hardware platforms, etc.

According to a further illustrative implementation of the present invention, the virtual machine configurator 12 automatically creates a virtual machine template to be added to the library according to the requests for software elements of a virtual machine. The automatic generation of the virtual machine template can be realized without human interference by means similar to those used for installing software elements to existing virtual machine templates.

For instance, the virtual machine configurator 12 can store requests for software elements of a virtual machine in the request database 20 and add a virtual machine template to the library according to the stored requests for software elements of a virtual machine. This allows having the library 14 of virtual machine templates 16 always prepared with a set of most suitable virtual machine templates that match a high number of requests. The kind of information stored in the request database 20 can comprise for example, names and versions of requested software element as well as specific sets of software elements to be considered together.

Also, the frequency or total number of uses of an existing virtual machine template can be stored in the request database 20. Furthermore, the evaluation of requests for software elements depending on a software hierarchy level can be individually stored. When a virtual machine template is added, in the case of limited resources of the library, an existing virtual machine template can at the same time be removed or deleted from the library. A selection process for the virtual library template to be removed can be applied similar to the described method for selecting a virtual machine template to be added. Virtual machine templates to be added to the library can be provided from different databases, actually used virtual machines according to user requests or manually created virtual machine templates, e.g., created by a system administrator.

Figure 2:
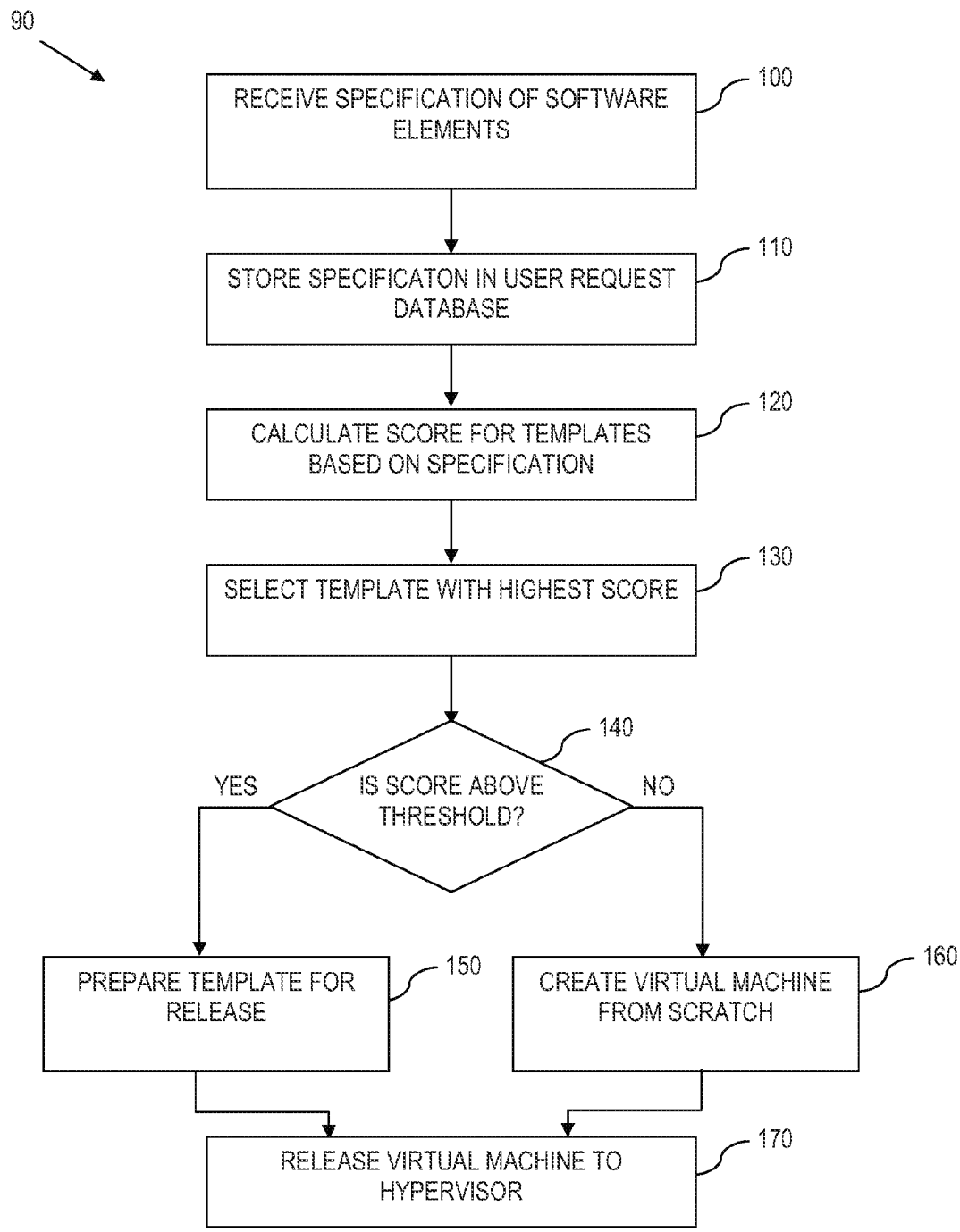
FIG. 2 shows a flowchart of a method for providing a virtual machine for use on a hypervisor, according to various aspects of the present invention.

Referring now to FIG. 2, a general method 90 for providing a virtual machine 26 according to a specification of a user of the present invention is shown. A user connects to the virtual machine configurator 12 via the user interface 22. The virtual machine configurator 12 displays available software elements in the user interface 22, e.g., according to software hierarchy levels. The software hierarchy levels in a working example are an operating system level, a middleware level, an application level, and a utility level. The user selects a choice of at least one software element and this selection is transmitted as a specification request via the network to the virtual machine configurator 12. Accordingly, the method receives at 100, a request of the user that specifies desired software elements to be included in the virtual machine.

At 110, the request of the user is transmitted from the virtual machine configurator 12 to the user request database 20. The user request is also stored for further evaluation in the user request database 20. Nevertheless, the user request can be stored in the user request database 20 basically at any time as long as the user request is being processed by the virtual machine configurator 12.

Based on the user request at 100, the virtual machine configurator 12 calculates a score value at 120 for all virtual machine templates 16 in the virtual machine template library 14.

According to an illustrative implementation of the present invention, the virtual machine configurator 12 includes a scoring algorithm. The virtual machine configurator 12 applies the scoring algorithm based on scores assigned to software elements where the scores are assigned to each software element based at least in part upon software hierarchy level.

In an exemplary scoring algorithm, the sum of the scores of all software elements of a certain software hierarchy level are below the score of each software element of the above software hierarchy level. Accordingly, the selection of an appropriate virtual machine template first depends on the upper hierarchy levels and only afterwards on lower hierarchy levels, since the scores of software elements of a certain hierarchy level can never reach the score of a software element from the above hierarchy level. Nevertheless, assigning the scores this way still allows high flexibility and also the assignment of different scores to software elements of the same hierarchy level.

According to another illustrative implementation of the present invention, the scoring algorithm is applied such that a software element is considered as a match if a software element name and a software element version match. Since different versions of a software element can comprise specific features, e.g., important bug fixes, fulfill certain performance requirements, show other advantages/disadvantages, etc., it can be important to exactly match the software element including the element version. Such a matching can also comprise the specification of a certain software element version as a threshold value, so that all software element versions above or below this threshold can be considered as a match.

According to an optional aspect of the present invention, calculating the score value can comprise a software element provided in a virtual machine template adding its score to the scoring value if the software element is requested by the user, and subtracting its score from the scoring value if the software element is not requested by the user. This allows the consideration of software elements which are contained in a certain virtual machine template as well of those, which are not contained in this virtual machine template. Accordingly, differences regarding the provisioning of software elements of the same hierarchy level can be considered for the selection of the virtual machine template. For example, software elements that are more complicated to install or require a longer time for installation can have a higher score.

As an illustration, the calculation of the score is based on the software hierarchy levels. For example, a set of three virtual machine templates 16 have the following configuration (i.e., software elements):

Virtual Machine Template #1:
Windows 2003 Server SP2
Virtual Machine Template #2:
Linux Red Hat ES 4.0
IBM DB2 9.1
WinZip 9.0
Virtual Machine Template #3:
Linux Suse 9.0
IBM Websphere Server 6.1
IBM DB2 8.5
IBM ITDS 6.0
TPM 7.1

Continuing with the example above, each of the software elements in the virtual machine templates has an assigned score according to the following list, which also identifies the software hierarchy level of each software element:

| Software Element Name And Version | Software Hierarchy Level | Score |
| --- | --- | --- |
| Windows 2003 Server SP2 | Operating System | 100000 |
| Linux Red Hat ES 4.0 | Operating System | 100000 |
| Linux Suse 9.0 | Operating System | 100000 |
| IBM WebSphere Server 6.1 | Middleware | 15000 |
| IBM DB2 9.1 | Middleware | 10000 |
| IBM DB2 8.5 | Middleware | 10000 |
| IBM ITDS 6.0 | Middleware | 8000 |
| TPM 7.1 | Application | 1000 |
| WinZip 9.0 | Utility | 50 |

The sum of the scores for all software elements from each software hierarchy level should be less than the lowest score of a software element from the respective upper software hierarchy level. In this example, the sum of the scores of the software elements from the middleware level is 43,000, whereas each operating system defining the upper software hierarchy level has a score of 100,000.

Continuing with the example above, assume for example that the user requests a virtual machine comprising Windows 2003 Server SP2 with IBM DB2 9.1 and WinZip 9.0.

Accordingly, the score values for the three virtual machine templates 16 are calculated like the following, with the applied score of each software element given in parentheses:

| Virtual machine template #1: | score value = +100000 |
| --- | --- |
| Windows 2003 Server SP2 | (+100000) |
| Virtual machine template #2: | score value = −89950 |
| Linux Red Hat ES 4.0 | (−100000) |
| IBM DB2 9.1 | (+10000) |
| WinZip 9.0 | (+50) |
| Virtual machine template #3: | score value = −134000 |
| Linux Suse 9.0 | (−100000) |
| IBM Websphere Server 6.1 | (−15000) |
| IBM DB2 8.5 | (−10000) |
| IBM ITDS 6.0 | (−8000) |
| TPM 7.1 | (−1000) |

An element is considered a match when the name and the version number of a software element match the name and the version number specified by the user. In case of a match, the positive score is applied, i.e., the score is added to the score value of a virtual machine template 16. Otherwise, the negative score is applied, i.e., the score is subtracted from the respective score value. In the example above, only the first virtual machine template 16 has a positive score value, whereas the score value of the other virtual machine templates 16 is negative.

At 130, the score values of the three virtual machine templates 16 are compared, and the virtual machine template 16 with the highest score is selected, which, in this example, is virtual machine template #1.

At 140, a verification process is performed to determine if the virtual machine template 16 is suitable compared to the user request specified at 100. For example, the score value is analyzed to verify, whether the score value is above a certain threshold value. Other criteria can be used to determine if the virtual machine template 16 is suitable. Moreover, other factors can be applied separately or in conjunction with the predetermined threshold value. If the virtual machine template 16 is considered suitable, the method 90 continues to 150; otherwise the method 90 continues to 160.

At 150, the virtual machine configurator 12 prepares the virtual machine template 16 for release as shown below in reference to FIG. 3.

If the virtual machine template 16 selected at 130 is not considered suitable at 140, then at 160 a new virtual machine 26 is created from the scratch. The details of step 160 can be seen below in reference to FIG. 4.

At 170, the virtual machine configurator 12 releases the virtual machine 26 to the user to be executed on the hypervisor 24, independently whether the virtual machine 26 was based on an existing virtual machine template 16 from the virtual machine template library 14 or was created from scratch.

Figure 3:
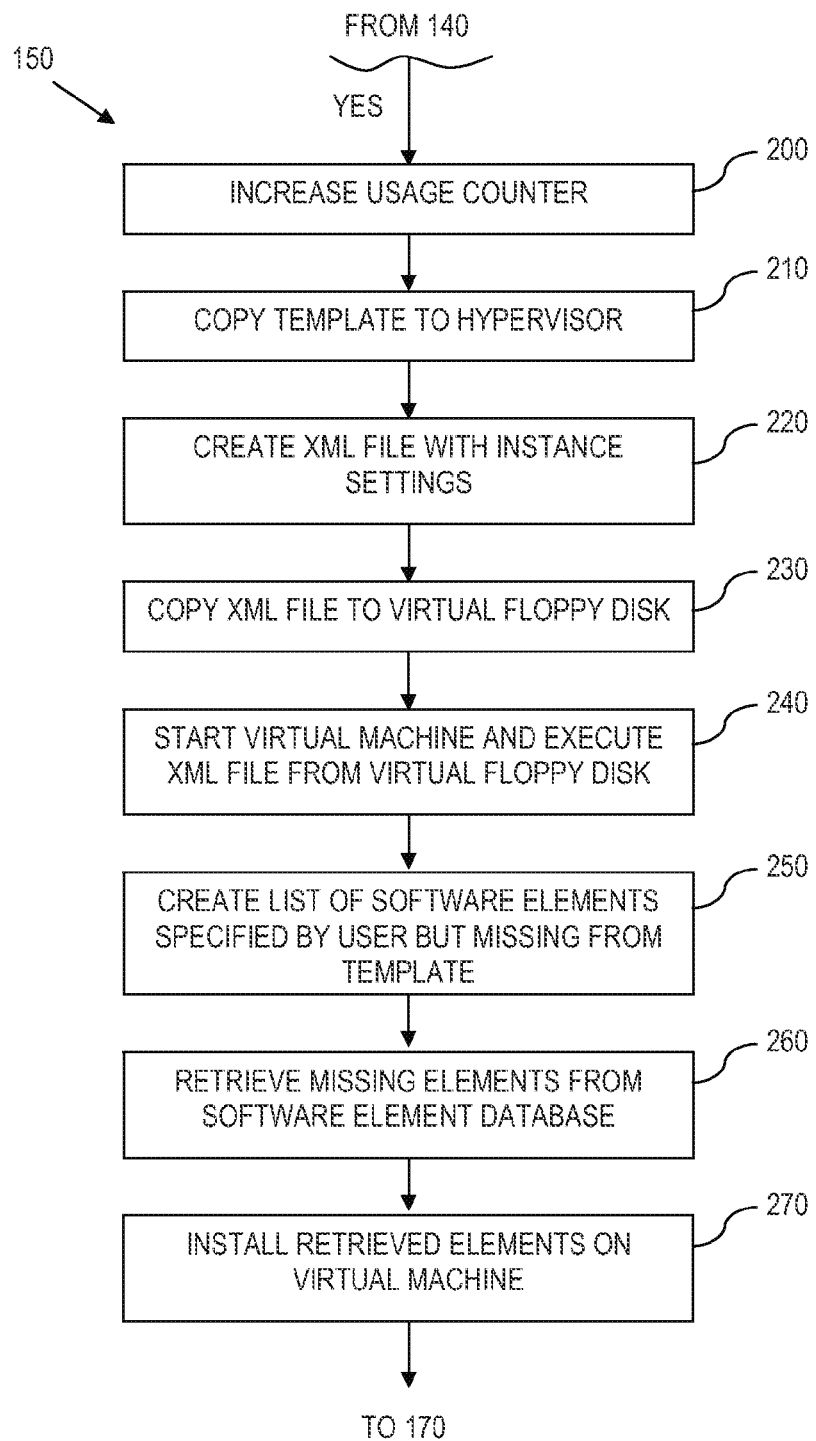
FIG. 3 shows a flowchart of method steps for provisioning a virtual machine based on an existing virtual machine template, according to various aspects of the present invention.

Referring now to FIG. 3, which shows a method of preparing the virtual machine template for release (150, FIG. 2) in more detail. A usage counter for the virtual machine template 16 is increased at 200 and is stored as historical data within the user request database 20.

At 210, the image of the virtual machine 26 is copied from the virtual machine template library 3 to the hypervisor 24.

At 220, an XML data file is created containing required instance settings before running the virtual machine 26 on the hypervisor 24. These settings include a network host name, an IP address, and so on.

At 230, the XML data file is copied to a virtual floppy disc, also called a v-floppy, and is attached to the virtual machine 26. When the virtual machine 26 is booted on the hypervisor 24, the virtual floppy disc becomes automatically visible to an activation engine of the hypervisor 24.

The virtual machine 26 is powered on at 240. Accordingly, the execution of activation scripts using the information of the v-floppy parameter file is automatically triggered.

At 250, the virtual machine configurator 12 creates a list of software elements that have been specified by the user at 100, but which are not contained in the selected virtual machine template 16.

The missing software elements are retrieved from the software element database 18 and are copied to the virtual machine 26 at 260.

At 270, the software elements are installed on the virtual machine 26. In an illustrative implementation, the required software elements are installed subsequently based on the software hierarchy levels, starting with the software elements from the highest software hierarchy level. The method then continues to 170 (FIG. 2).

Referring to FIGS. 1-3 generally, according to an illustrative implementation of the present invention, the virtual machine configurator 12 selects the template having the highest score (130, FIG. 2) based upon the software elements specified by the user (100, FIG. 2). The virtual machine configurator 12 connects to the software element database 18 and automatically installs remaining software elements that are specified by the user (at 100 FIG. 2) but are not provided in the selected virtual machine template to the virtual machine before delivery. This enables the automatic installation of software elements as specified by the user, which are not already contained in the virtual machine template. Accordingly, with the best matching virtual machine template as basis, a high variety of configurations of virtual machines can be provided by adding different software elements with high efficiency.

Figure 4:
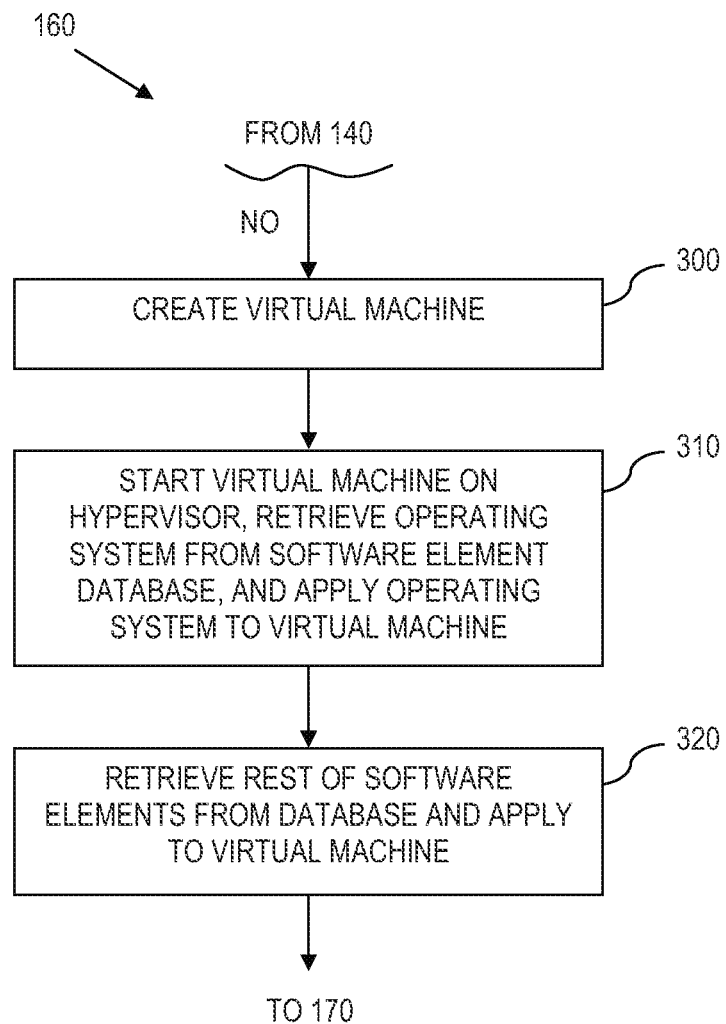
FIG. 4 shows a flowchart of method steps for provisioning a virtual machine from scratch, according to various aspects of the present invention.

Referring now to FIG. 4, a method of creating a virtual machine from scratch (160, FIG. 2) is depicted in greater detail. The virtual machine configurator 12 creates a new virtual machine 26 at 300, and performs the configuration of its hardware resources.

At 310, the virtual machine 26 is started on the hypervisor 24 and the image file of the operating system is retrieved from the software elements library 18, so the installation of the operating system can be started, e.g., by applying the operating system to the virtual machine.

At 320, all required software elements according to the configuration requested by the user are retrieved from the software element library 18 and are installed on the virtual machine. Then method then continues to 170 (FIG. 2).

Referring to the FIGURES generally, at any point including before the described method 90 or afterwards, historical data of the request can be analyzed to evaluate whether the virtual machine template library 14 has to be updated by adding a virtual machine template 16 or by replacing an existing virtual machine template 16 by a different virtual machine template 16. Virtual machine templates 16 to be added can be built from the scratch as shown in FIG. 4 or new virtual machine templates 16 can be based on existing virtual machine templates 16, which are updated with additional software elements according to FIG. 3.

In exemplary implementations, the virtual machine configurator 12 evaluates whether the virtual machine template library 14 has to be updated based on the starting software hierarchy levels. The number of prior provisioning requests that match the configuration starting from the highest software hierarchy level is compared to a certain threshold value. To be more detailed, the user requests are considered only in respect of the operating system level; and then by considering both the operating system level and the middleware level; and then by additionally considering the application level; and finally by considering all four levels: the operation system level, the middleware level, the application level and the utility level. In case the threshold value is exceeded, the virtual machine 26 containing the respective configuration is designated as candidate to become a template. The candidate will be added to the virtual machine template library 14 after being created, as described more fully herein.

When the capacity of the virtual machine template library 14 reaches its limit, the least frequently requested virtual machine template 16 from the virtual machine template library 14 is removed. In this way, the virtual machine template library 14 will always contain the most suitable virtual machine templates 16, so that the provisioning of a virtual machine 26 to a user can also be automatically performed in an efficient manner.

According to aspects of the present invention, a virtual machine template can be added to the library according to the stored requests for software elements of a virtual machine by verifying if software elements, which are not contained in any virtual machine template provided in the library, have been requested at least a certain number of times. A threshold value can be defined to provide a limit, so that a virtual machine template will be added to the library when the threshold value is reached according to the request database. The threshold value can be dynamically modified, e.g., to take into account the number of already available virtual machine templates and a capacity of the library. Such a threshold value can be defined for entire sets of software elements forming a virtual machine or can be based on software elements of a hierarchy level.

Also individual software elements of a software hierarchy a level can be taken into account, if they are frequently requested. If the virtual machine template to be added will replace an existing virtual machine template, the virtual machine template to be removed can be chosen in a way similar to the one described for adding the virtual machine template. For example, the least frequently chosen virtual machine template can be removed from the library. A replacement also can be applied when a certain configuration a software elements of a virtual machine that is already represented in the library as a virtual machine template, is less frequently requested than a different configuration, which has not yet been added to the library.

In an illustrative implementation of the present invention, adding a virtual machine template to the library according to the stored requests for software elements of a virtual machine comprises verifying if software elements, which are not contained in any virtual machine template provided in the library, are more frequently requested than at least one virtual machine template provided in the library. Frequency of use can indicate in a short time increasing importance of a software element.

Creating a virtual machine from a template takes less processing time than if the virtual machine was created from scratch. Thus, the methods herein, for creating a virtual machine, take less time to create a virtual machine than a virtual machine made from scratch. Further, by using the score method to determine the template, the user does not need to choose a specific template therefore the user does not need to sift through a large number of templates. Thus, there is also a smaller chance that an inappropriate template may be chosen, which could cut down on the amount of customization needed to create the virtual machine from the chosen template.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be implemented as a system, method or computer program product embodied in one or more computer-readable medium(s) having computer readable program code embodied thereon. Thus, aspects herein can be implemented as a computer program product (computer readable storage device) containing a set of instruction that causes a processor such as in a computer to perform the methods set out herein. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a Blu-ray™ disc an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-readable memory with an executable program stored thereon, wherein the program instructs a processor to perform:
   storing software elements in a software element database, the software elements having a software element hierarchy including an operating system level, wherein the software elements include software element definitions including software element name and software element version associated for each software element definition;
   assigning a score to at least one of the software elements based at least in part upon the software element's hierarchy level, wherein the assigned scores provide priority to a given level of the hierarchy over levels of the hierarchy lower than the given level;
   providing virtual machine templates in a library, wherein the virtual machine templates include at least one software element associated with a software element from the software element database;
   providing a user interface for a user to specify desired software elements to be included in the virtual machine;
   calculating a score value for at least one virtual machine template from the library, based on the scores assigned to the software elements, wherein a software element is a match if a software element name and a software element version match a software element name and software element version in the specified desired software elements;
   selecting from the library the virtual machine template having the highest score value; and,
   delivering the selected virtual machine template as the virtual machine to the hypervisor.

2. The computer-readable memory of claim 1, wherein the software element hierarchy further includes a middleware level, an application level, and a utility level, wherein the operating system level is the highest hierarchy level, and the utility level is the lowest software hierarchy level; and assigning a score to at least one of the software elements further comprises assigning different scores for different hierarchy levels.

3. The computer-readable memory according to claim 1, wherein assigning the score further comprises assigning scores to each software element of a given software hierarchy level so that the sum of the scores of all software elements of the given software hierarchy level are below the lowest score of a software element of a software hierarchy level above the given software hierarchy level.

4. The computer-readable memory of claim 1, wherein calculating a score value further comprises for each software element provided in each virtual machine template:
   adding the software element's score to the score value if the software element is a match, and
   subtracting software element's score from the score value if the software element is not a match.

5. The computer-readable memory according to claim 1 further comprising:
   storing installable files of software elements in the software element database; and
   automatically installing software elements that are included in the specified desired software elements but that are not included in the virtual machine template, to the virtual machine.

6. The computer-readable memory according to claim 1 wherein the program further instructs the processor to perform:
   storing requests for software elements in a request database;
   creating a new virtual machine template based at least in part on the stored requests; and
   storing the new virtual machine template in the library.

7. The computer-readable memory according to claim 6, wherein creating a new virtual machine template further comprises creating a new virtual machine template based at least in part on verifying a condition related to a number of times the software elements have been requested, if the software elements are not contained in any virtual machine template.

8. The computer-readable memory according to claim 7, wherein verifying a condition comprises verifying if the software elements are more frequently requested than at least one virtual machine template provided in the library.

9. Computer-readable memory with an executable program stored thereon, wherein the program instructs a processor to perform:
   storing software elements in a software element database, the software elements having a software element hierarchy including an operating system level;
   storing installable files of software elements in the software element database;
   assigning a score to at least one of the software elements based at least in part upon the software element's hierarchy level, wherein the assigned scores provide priority to a given level of the hierarchy over levels of the hierarchy lower than the given level;
   providing virtual machine templates in a library, wherein the virtual machine templates include at least one software element associated with a software element from the software element database;
   providing a user interface for a user to specify desired software elements to be included in the virtual machine;
   calculating a score value for at least one virtual machine template from the library, based on the scores assigned to the software elements;
   selecting from the library the virtual machine template having the highest score value;

delivering the selected virtual machine template as the virtual machine to the hypervisor and automatically installing software elements that are included in the specified desired software elements but that are not included in the virtual machine template, to the virtual machine.

10. The computer-readable memory of claim 9, wherein the software element hierarchy further includes a middleware level, an application level, and a utility level, wherein the operating system level is the highest hierarchy level, and the utility level is the lowest software hierarchy level; and assigning a score to at least one of the software elements further comprises assigning different scores for different hierarchy levels.

11. The computer-readable memory according to claim 9, wherein assigning the score further comprises assigning scores to each software element of a given software hierarchy level so that the sum of the scores of all software elements of the given software hierarchy level are below the lowest score of a software element of a software hierarchy level above the given software hierarchy level.

12. The computer-readable memory according to claim 9, wherein:

storing software elements includes storing software element definitions including software element name and software element version associated for each software element definition; and calculating the score value comprises considering a software element as a match if a software element name and a software element version match a software element name and software element version in the specified desired software elements.

13. The computer-readable memory of claim 12, wherein calculating a score value further comprises for each software element provided in each virtual machine template:

adding the software element's score to the score value if the software element is a match, and subtracting software element's score from the score value if the software element is not a match.

14. The computer-readable memory according to claim 9 wherein the program further instructs the processor to perform:

storing requests for software elements in a request database;

creating a new virtual machine template based at least in part on the stored requests; and storing the new virtual machine template in the library.

15. The computer-readable memory according to claim 14, wherein creating a new virtual machine template further comprises creating a new virtual machine template based at least in part on verifying a condition related to a number of times the software elements have been requested, if the software elements are not contained in any virtual machine template.

16. The computer-readable memory according to claim 15, wherein verifying a condition comprises verifying if the software elements are more frequently requested than at least one virtual machine template provided in the library.

17. Computer-readable memory with an executable program stored thereon, wherein the program instructs a processor to perform:

storing software elements in a software element database, the software elements having a software element hierarchy including an operating system level;

assigning a score to at least one of the software elements based at least in part upon the software element's hierarchy level, wherein the assigned scores provide priority to a given level of the hierarchy over levels of the hierarchy lower than the given level;

providing virtual machine templates in a library, wherein the virtual machine templates include at least one software element associated with a software element from the software element database;

providing a user interface for a user to specify desired software elements to be included in the virtual machine;

storing requests for software elements in a request database;

creating a new virtual machine template based at least in part on verifying if the requested software elements are more frequently requested than at least one virtual machine template provided in the library, if the software elements are not contained in any virtual machine template;

storing the new virtual machine template in the library;

calculating a score value for at least one virtual machine template from the library, based on the scores assigned to the software elements;

selecting from the library the virtual machine template having the highest score value; and delivering the selected virtual machine template as the virtual machine to the hypervisor.

18. The computer-readable memory according to claim 17, wherein assigning the score further comprises assigning scores to each software element of a given software hierarchy level so that the sum of the scores of all software elements of the given software hierarchy level are below the lowest score of a software element of a software hierarchy level above the given software hierarchy level.

19. The computer-readable memory according to claim 17, wherein:

storing software elements includes storing software element definitions including software element name and software element version associated for each software element definition; and calculating the score value comprises considering a software element as a match if a software element name and a software element version match a software element name and software element version in the specified desired software elements.

20. The computer-readable memory of claim 19, wherein calculating a score value further comprises for each software element provided in each virtual machine template:

adding the software element's score to the score value if the software element is a match, and subtracting software element's score from the score value if the software element is not a match.

* * * * *